United States Patent [19]
Goto et al.

[11] Patent Number: 5,709,912
[45] Date of Patent: Jan. 20, 1998

[54] AUTOMOBILE DECORATION MOLDING

[75] Inventors: Shinichi Goto; Masao Kobayashi; Yasuhisa Kuzuya; Hidehito Ichikawa, all of Aichi, Japan

[73] Assignee: Toyoda Gosei Co., Ltd., Nishikasugai-gun, Japan

[21] Appl. No.: 331,382

[22] Filed: Oct. 28, 1994

[30] Foreign Application Priority Data

Oct. 29, 1993 [JP] Japan ................. 5-272046

[51] Int. Cl.⁶ ........................................ B60R 13/04
[52] U.S. Cl. ............ 428/31; 52/716.5; 156/244.11; 293/128
[58] Field of Search ................. 428/31; 52/716.5; 156/244.11; 293/128

[56] References Cited

U.S. PATENT DOCUMENTS

| 4,382,114 | 5/1983 | Hölein et al. ........... 428/31 X |
| 4,911,959 | 3/1990 | Miyakawa ............... 428/31 |

FOREIGN PATENT DOCUMENTS 595093  1/1984  Japan ..................... 428/913

Primary Examiner—Henry F. Epstein
Attorney, Agent, or Firm—Cushman, Darby & Cushman IP Group of Pillsbury Madison & Sutro LLP

[57] ABSTRACT

An automobile decoration molding includes a decoration molding body formed by extrusion-molding a synthetic resin material; and an end part formed by remolding the end portion of the decoration molding body with a die. At least the end portion of the decoration molding body which is to be formed into the end part is formed by using the synthetic resin material kneaded with electrically conductive metallic powder, and the end portion of the decoration molding body which is to be formed into the end part is obliquely cut in such a manner that the resultant cut becomes larger in the direction opposite to a decorative surface of the decoration molding body, and the end portion thus processed is remolded with a die consisting of an upper half die and a lower half die.

8 Claims, 4 Drawing Sheets

AUTOMOBILE DECORATION MOLDING

BACKGROUND OF THE INVENTION

The present invention relates to decoration moldings for automobiles, and more particularly to a decoration molding providing a decorative surface of good appearance.

Conventional automobile decoration moldings of this type are, for instance, as shown in FIGS. 3(a), 3(b), 4(a) and 4(b).

FIG. 3(a) is a plan view showing a conventional automobile decoration molding and and FIG. 3(b) is a center cross sectional view showing a conventional automobile decoration molding. FIG. 4(a) is an enlarged sectional view showing a main portion of a conventional automobile decoration molding and FIG. 4(b) is an enlarged sectional view showing a main portion of another conventional automobile decoration molding.

In those figures, a decoration molding body 1 is, in general, continuously formed by extrusion molding or the like and cut to a predetermined length. Its surface shown in FIG. 3(a) is a decorative surface. An end part 2 is formed on one or both of the ends of the decoration molding body 1 by injection molding, so that one or both of the ends of the decoration molding body 1 continuously formed by the extrusion molding or the like are finished as required.

In an automobile decoration molding of this type, as shown in FIG. 3(b), it is assumed that the end face 1a of the decoration molding body 1 and the junction surface 2a of the end part 2 are joined to each other in a vertical plane. Thus, the decoration molding body 1 and the end part 2 are substantially equal in thickness to each other.

The automobile decoration moldings thus formed are fixed to a vehicle body with fixing means such as a double sided adhesive tape or clip provided on the rear sides of the decoration molding body 1 and the end part 2.

As was described above, in the conventional automobile decoration molding as shown in FIG. 3(a), it is assumed that the end face 1a of the decoration molding body 1 is joined to the junction surface 2a of the end part 2 in a vertical plane as shown in FIG. 3(b). However, in practice, the end face 1a of the decoration molding body 1 is curved as shown in FIGS. 4(a) and 4(b) by the injection molding pressure applied when the end part 2 is molded. That is, depending on the elasticity of synthetic resin forming the decoration molding body 1, and the injection molding pressure applied when the end part 2 is formed by injection molding, the junction surface 2a of the end part 2 is curved towards the decoration molding body 1.

The decoration molding body 1 and the end part 2 are substantially equal in thickness to each other as was described above; however, they are not always equal in property depending on the elasticity of synthetic resin forming the decoration molding body 1 and the elasticity of synthetic resin forming the end part 2. Hence, a sink mark 3 occurs in the side of the junction surface 2a of the end part 2 as shown in FIG. 4(a), so that the surface of the end part is separated from that of the decoration molding body; that is, the decoration molding body 1 and the end part 2 cannot provide a flat continuous decorative surface. The sink mark 3 impairs the decorative surface of the decoration molding body 1 and the end part 2 especially when they are colored, or they are covered with bright film layers; that is, when they are subjected to surface-treatment to have such a function as to enlarge the sink mark 3.

On the other hand, if the injection molding pressure for the end part 2 is decreased, then a gap 4 occurs in the junction surface 2a of the end part 2 and the end face 1a of the decoration molding body 1 as shown in FIG. 4(b). The gap 4 may decrease not only the bonding force but also the appearance of the decorative surface.

In order to prevent the gap 4 so as to improve the bonding force and the appearance of the decorative surface, it may be considered to pre-heat the decoration molding body 1 by dielectric heating. However, the dielectric heating is low in efficiency, and is unable to heat a part of the decoration molding body at high temperature.

SUMMARY OF THE INVENTION

Hence, a first object of the present invention is to provide an automobile decoration molding in which a decoration molding body can be dielectrically heated with high efficiency. A second object of the present invention is to provide an automobile decoration molding in which a decorative surface has a good appearance with no molding traces of the decoration molding body and the end part therein, and has no sink mark.

An automobile decoration molding according to a first aspect of the present invention comprises a decoration molding body formed by extrusion-molding a synthetic resin material; and an end part formed by remolding the end portion of the decoration molding body with a die, in which, at least the end portion of the decoration molding body which is to be formed into the end part is formed by using a synthetic resin material which is kneaded with electrically conductive metallic powder.

An automobile decoration molding according to a second aspect of the present invention comprises a decoration molding body formed by extrusion-molding a synthetic resin material; and an end part formed by remolding the end portion of the decoration molding body with a die, in which the end portion of the decoration molding body which is to be formed into the end part is obliquely cut in such a manner that the resultant cut becomes larger in the direction opposite to a decorative surface of the decoration molding body, and such end portion is inserted in the die to perform remolding.

In the automobile decoration molding according to the first aspect, a part or the whole of the decoration molding body is formed by using the synthetic resin material kneaded with the electrically conductive metallic powder, and the end portion of the decoration molding body is remolded with the die into the desired end part.

In the automobile decoration molding according to the second aspect, the end portion of the decoration molding body which is to be formed into the end part is obliquely cut in such a manner that the resultant cut becomes larger in the direction opposite to the decorative surface of the decoration molding body, and the end portion thus processed is remolded with the die. In this remolding process, the decorative surface is continuously curved while the end part is being formed, so that no molding traces of the decoration molding body and the end part are found between the decoration molding body and the end part. Thus, the resultant decorative surface is considerably fine in appearance.

DETAILED DESCRIPTION OF THE PREFERRED EMBODIMENTS

Figure 1A:
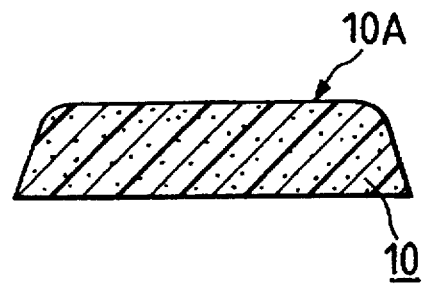
FIGS. 1(a), 1(b) and 1(c) are sectional views showing examples of a decoration molding body forming an automobile decoration molding according to the present invention.
Figure 1B:
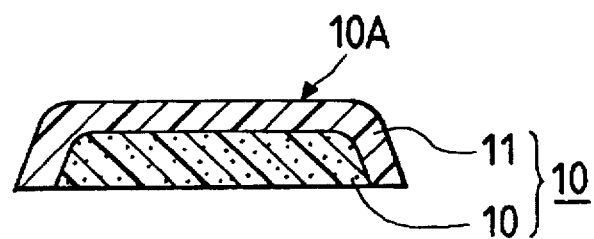
Figure 1C:
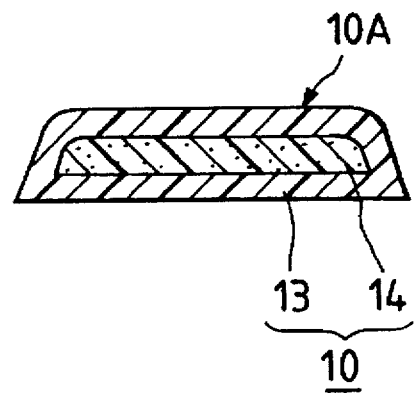

FIGS. 1(a) to 1(c) show a plurality of examples of a decoration molding body forming an automobile decoration molding according to the present invention.

More specifically, FIG. 1(a) shows a first example of the decoration molding body 10, which is continuously extrusion-molded by using an extrusion molding machine. In other words, the decoration molding body 10 is formed by extrusion-molding the synthetic resin material which is kneaded with metallic powder (particles). The mixing ratio of the metallic powder is determined according to the output, heating temperature and heating time of a dielectric heating device for dielectrically heating the decoration molding body 10. Since the synthetic resin material forming the decoration molding body is kneaded with the electrically conductive metallic powder as was described above, the exposed surface (upper surface) of the decoration molding body 10 as a decorative surface 10A has the color due to the metallic powder.

FIG. 1(b) shows a second example of the decoration molding body 10, which comprises: a cover 11 and a base 12. The cover 11 is a layer which determines the color of the decorative surface (exposed surface) 10A of the decoration molding body 10 and affects the material taste thereof. The base 12 is made of a synthetic resin material which is positively bonded to the cover 11. It is preferable that the cover 11 and the base 12 are made of the same material. In this connection, it should be noted that, even if they are different in material from each other, the present invention can be realized satisfactorily; however, in this case, it is true that lines appear in the finished surface of the decoration molding body which is opposite to the decorative surface 10A. The decoration molding body is formed as follows: First, the base 12 is formed by extrusion-molding the synthetic resin material kneaded with conductive metallic powder, and immediately after the formation of the base 12, the cover 11 is formed over the base 12 by extrusion molding so that the cover 11 is integrally formed with the base 12. The mixing ratio of metallic powder is determined from the output and heating time of the dielectric heating device which is used to heat the cover 11 of the decoration molding body 10 indirectly through the base 12; that is, to dielectrically heat the base 12, and from the temperature rise of the cover 11 due to thermal conduction and dielectric heating. The color and the material taste of the decoration molding body depend on those of the cover 11.

FIG. 1(c) shows a third example of the decoration molding body 10, which also comprises a cover 13 and a base 14. The cover 13 is a layer which determines the color of the decorative surface (exposed surface) 10A of the decoration molding body 10 and affects its material taste. The base 14 is made of a synthetic resin material which is positively bonded to the cover 13. It is preferable that the cover 13 and the base 14 are made of the same material. The decoration molding body is formed as follows: First, the base 14 is formed by extrusion-molding the synthetic resin material kneaded with conductive metallic powder, and immediately after the formation of the base 14, the cover 13 is formed around the base 14 by extrusion-molding so that the cover 13 is integral with the base 14. The mixing ratio of metallic powder is determined from the output and heating time of the dielectric heating device which is used to heat the cover 13 of the decoration molding body 10 indirectly through the base 14; that is, to dielectrically heat the base 14, and from the temperature rise of the cover 13 due to thermal conduction and dielectric heating. The color of the decoration molding body 10 depends on the cover 13.

Now, a method of manufacturing the automobile decoration molding according to the present invention will be described.

Figure 2A:
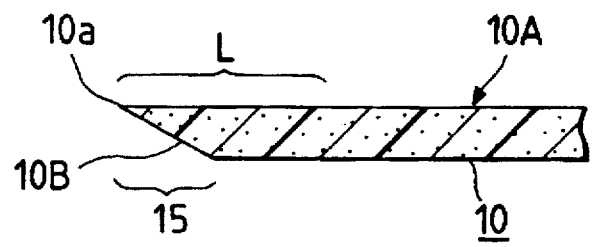
FIGS. 2(a), 2(b) and 2(c) are explanatory diagrams for a description of a method of manufacturing the automobile decoration molding according to the present invention.
Figure 2B:
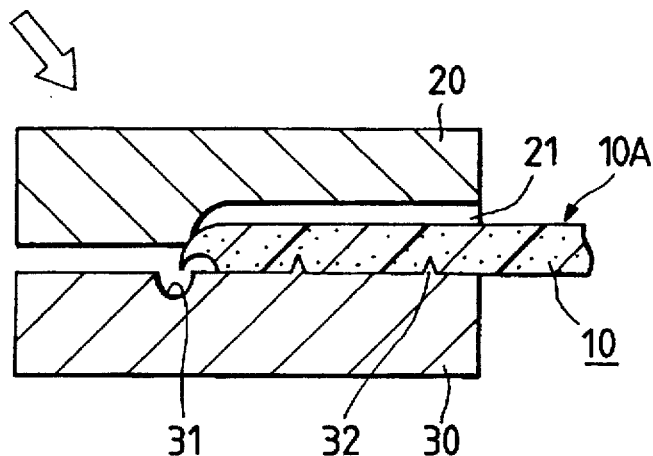
Figure 2C:
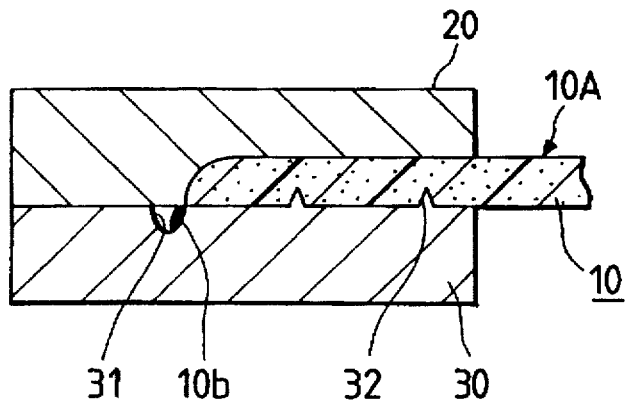
Figure 3A:
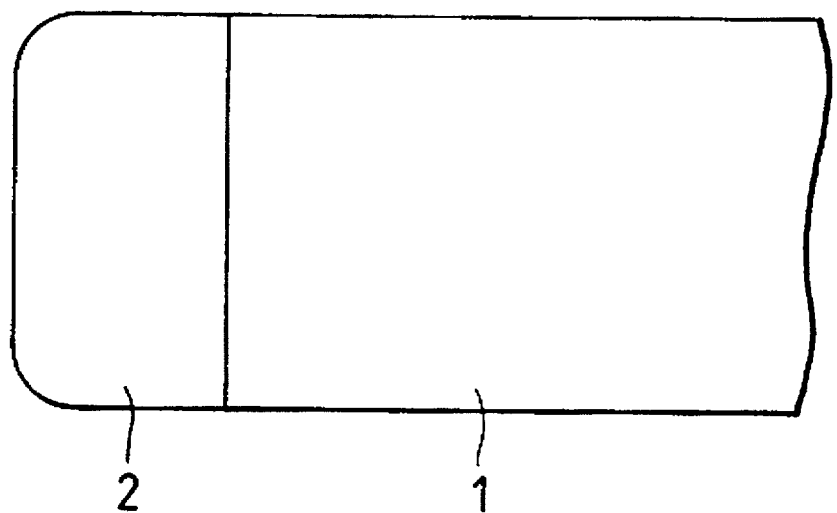
FIGS. 3(a) and 3(b) are a plan view and a cross sectional view, respectively, showing a conventional automobile decoration molding.
Figure 3B:
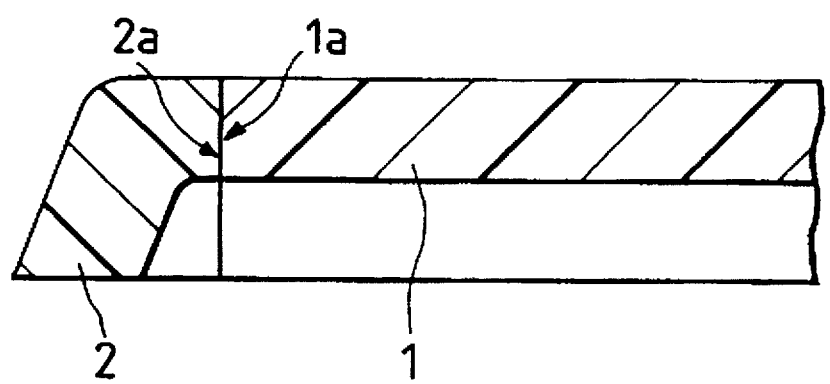
Figure 4A:
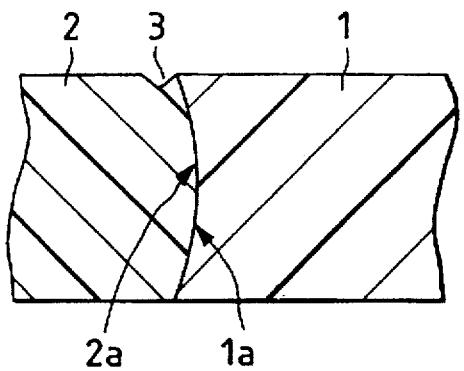
FIGS. 4(a) and 4(b) are enlarged sectional views showing examples of the junction of a decoration molding body and an end part which form a conventional automobile decoration molding.
Figure 4B:
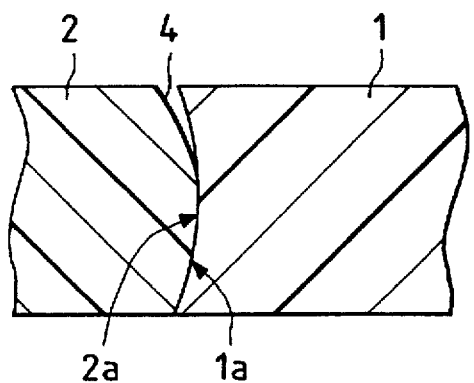

FIGS. 2(a) to 2(c) show steps in the method of manufacturing the automobile decoration molding.

In FIG. 2(a), one of the decoration molding bodies 10 shown in FIGS. 1(a), 1(b) and 1(c) is used. That is, there is used the decoration molding body 10 shown in FIG. 1(a) in which a decoration molding body 10 is formed by extrusion-molding synthetic resin material kneaded with electrically conductive metallic powder, the decoration molding body 10 shown in FIG. 1(b) in which the cover 11 determining the color of the decorative surface (exposed surface) 10A and affecting the material taste, and the base 12 of synthetic resin material kneaded with electrically conductive metallic powder are formed by two-color extrusion molding, or the decoration molding body 10 shown in FIG. 1(c) in which the cover 13 determining the color of the decorative surface (exposed surface) 10A and affecting the material taste, and the base 14 of synthetic resin material kneaded with electrically conductive metallic powder are formed by two-color extrusion molding. A part of the end portion of the decoration molding body 10 is obliquely cut so that an endmost portion 10a of an end part 15 has an angle of about 45° or less. More specifically, the end portion of the decoration molding body 10 is cut downward to the right so that the resultant cut 10B becomes larger in the direction opposite to the decorative surface 10A of the decoration molding body 10. In this operation, the angle is determined from molding conditions such as the desired configuration of the end part 15 to be formed, heating temperature, and material viscosity.

Thereafter, the remaining end portion L of the resultant decoration molding body 10, which is about 1.5 to 2 times as long as the desired end part 15 to be processed later, is softened by dielectric heating so that it can be remolded.

The decoration molding body 10 with the end portion L, the end portion including the end part 15, having a length 1.5–2 times as long as the end part 15, and having been softened as was described above, is set on a lower half die 30 as shown in FIG. 2(b). In this operation, protrusions 32 of the lower half die 30 are inserted into the decoration molding body 10 thus set, to prevent the latter 10 from moving along the upper surface of the lower half die 30. Under this condition, an upper half die 20 is moved downwardly in such a manner that the lower end portion of a molding recess 21 of the upper half die 20 abuts against the endmost portion 10a of the decoration molding body 10, and then the upper half die 20 presses so that the endmost portion 10a is curved downwardly. As a result, the endmost portion 10a is formed into the end part 15 as shown in FIG. 2(c). In this operation, a surplus of the endmost portion 10a of the decoration molding body 10 which has not been used for the formation of the end part 15 is received as surplus resin 10b in a surplus receiving recess 31 of the lower half die 30.

As is apparent from the above description, when the decoration molding body 10 with the end portion L which is about 1.5 to 2 times as long as the end part 15 and has been softened so as to be remolded, is pressed between the upper half die 20 and the lower half die 30, the lower end portion of the molding recess 21 of the upper half die 20 gradually bends the endmost portion 10a of the decoration molding body 10 downwardly, so that the endmost portion 10a is deformed with the decorative surface 10A of the decoration molding body 10 being kept strained at all times. Thus, the end part 15 has been formed at the end of the decoration molding body 10 formed by extrusion molding, with no molding traces of the end part 15 in the decorative surface. The end part 15 thus formed is equivalent to the one which is formed by injection molding, and provides a fine decorative surface 10A.

As was described above, the automobile decoration molding of the present invention is made up of the decoration molding body 10 formed by extrusion-molding synthetic resin material, and the end part 15 formed by remolding the end portion of the decoration molding body 10 with the die. In the automobile decoration molding, at least the end portion of the decoration molding body 10 which is to be formed into the end part 15 is formed by using the synthetic resin material kneaded with electrically conductive metallic powder.

Hence, in the dielectric heating operation, the decoration molding body 10 is made large in dielectric loss, and is heated with high efficiency, so that the end part 15 can be effectively formed. In the present invention, the decoration molding body 10 is not always limited to the one which contains the electrically conductive powder in its entirety. That is, in the case of the decoration molding body shown in FIG. 1(a) and in the case of the base 12 or 14 shown in FIG. 1(b) or 1(c), only a part of the decoration molding body or of the base may contain the electrically conductive powder. In this case where a material partially containing the electrically conductive powder is used for the decoration molding body 10, it is preferable that, as in the case of the base 12 or 14, the thickness of the cover 11 or 13 should be determined in view of the distribution of heat in dielectric heating. Thus, in the automobile decoration molding of the present invention, the decorative surface is fine in appearance with no molding traces of the decoration molding body 10 and the end part 15, and the decorative surface 10A has no sink mark.

In the present invention, the electrically conductive powder is not always limited to the metallic powder. That is, any powder which is large in dielectric loss may be employed as the conductive powder. The size of the powder should be such that boundaries are not present against particles, but the size is at most equal to that of particles which can be kneaded.

As was described above, the automobile decoration molding of the present invention is made up of the decoration molding body 10 formed by extrusion-molding synthetic resin material, and the end part 15 formed by remolding the end portion of the decoration molding body 10 with a die. In the automobile decoration molding, the end portion of the decoration molding body 10 which is to be formed into the end part 15 is obliquely cut in such a manner that the resultant cut 10B becomes larger towards the surface of the decoration molding body which is opposite to the decorative surface 10A, and the end portion thus processed is remolded with the die having the upper half die 20 and the lower half die 30.

As the decoration molding body 10, the end portion of which has been softened to the extent that it can be remolded with the die, is pressed between the upper and lower half dies, the decorative surface 10A of the decoration molding body 10 is gradually bent downwardly; that is, the end portion of the decoration molding body 10 is bent while the decorative surface 10A being kept restrained. Hence, when the end part 15 is formed, no molding trace of the end part 15 is present in the decorative surface 10A of the decoration molding body 10; that is, the decorative surface 10A is fine in appearance. If summarized, in the automobile decoration molding of the present invention, the decorative surface is fine in appearance with no molding traces of the decoration molding body 10 and the end part 15 therein, and has no sink mark.

Figure 5:
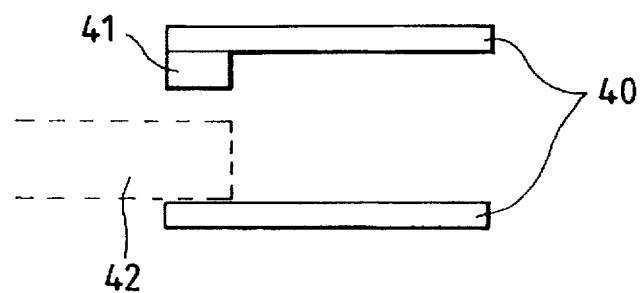
FIG. 5 is a schematic view showing a dielectric heating device.

A dielectric heating device used in the present invention will be described. FIG. 5 is a schematic view showing a dielectric heating device. The device includes flat-shaped electrodes 40 and an auxiliary electrode 41. The auxiliary electrode 41 is shaped in accordance with the shape of a portion, which is to be heated, of a molding 42, and is replaceable. That is, the auxiliary electrode is designed in accordance with the width and length (of an end portion) of the molding.

The dielectric heating device is operated, for example, in the following conditions. That is, a high frequency output is 2KW, a frequency is 62 MHz, and a heating time is 15–25 S, and press cooling is conducted for 30–60 S. According to the heating by this device, an end portion (including an inside) of a molding is heated up to 150°–190° C.

In the above-described embodiment, the end portion of the decoration molding body 10 is subjected to dielectric heating; however, the present invention is not limited thereto or thereby. That is, any heating means may be employed which is able to soften the end portion of the decoration molding body 10 to the extent that it can be remolded with the die. On the other hand, the end portion of the decoration molding body 10 may be set in the die while being subjected to dielectric heating.

In the above-described embodiment, the end portion of the decoration molding body 10 which is to be formed into the end part 15 is obliquely cut in such a manner that the resultant cut 10B becomes larger in the direction opposite to the decorative surface 10A; that is, it is linearly cut. However, it may be arcuately cut.

As was described above, the automobile decoration molding according to the first aspect comprises the decoration molding body formed by extrusion-molding synthetic resin material; and the end part formed by remolding the end portion of the decoration molding body with a die, in which at least the end portion of the decoration molding body which is to be formed into the end part is formed by using a synthetic resin material kneaded with electrically conductive metallic powder. Hence, the decoration molding body can be made large in dielectric loss, and subjected to dielectric heating with high efficiency, so that the end part can be effectively formed. Thus, the resultant decorative surface is fine in appearance with no molding traces of the decoration molding body and the end part found therein, and it has no sink mark.

Furthermore, the automobile decoration molding according to the second aspect comprises the decoration molding body formed by extrusion-molding synthetic resin material; and the end part formed by remolding the end portion of the decoration molding body with a die, in which the end portion of the decoration molding body which is to be formed into the end part is obliquely cut in such a manner that the resultant cut becomes larger in the direction opposite to a decorative surface of the decoration molding body. Hence, when the decoration molding body, the end portion of which has been softened to the extent that it can be remolded with the die, is pressed between the upper and lower half dies, the decorative surface of the decoration molding body is gradually bent downwardly; that is, the end portion of the decoration molding body is bent with the decorative surface being kept restrained. Hence, when the end part is formed, no molding trace of the end part is found in the decorative surface of the decoration molding body; that is, the decorative surface is fine in appearance. Thus, the decorative surface of the automobile decoration molding of the present invention is fine in appearance with no molding traces of the decoration molding body and the end part therein, and the decorative surface has no sink mark.

What is claimed is:

1. An automobile decoration molding, comprising:
   a decoration molding body formed by extrusion-molding a synthetic resin material; and
   an end part formed from an obliquely cut area of an end portion, remaining on said body, that has been heated and remolded in a die, wherein
   at least said end portion of said decoration molding body which is to be formed into said end part is formed from a mixture of said synthetic resin material and an electrically conductive powder.

2. An automobile decoration molding as claimed in claim 1, wherein said decoration molding body includes a base and a cover as a decorative surface provided on one surface of said base.

3. An automobile decoration molding as claimed in claim 1, wherein said decoration molding body includes a base and a cover as a decorative surface provided on the entire surfaces of said base.

4. An automobile decoration molding, comprising:
   a decoration molding body formed by extrusion-molding a synthetic resin material; and
   an end part comprising a remolded end portion of said decoration molding body, wherein
   said end portion of said decoration molding body which is remolded into said end part is obliquely cut in such a manner that a resultant cut on said end portion is larger in a direction opposite to a decorative surface of said decoration molding body, and said obliquely cut end portion, remaining on said body, is placed in and remolded in a die.

5. A method of manufacturing an automobile decoration molding, comprising the steps of:
   forming a decoration molding body by extrusion-molding a synthetic resin material;
   cutting a part of an end portion of said decoration molding body to form an end part such that a resultant cut has a larger dimension in a direction opposite to a decorative surface of said decoration molding body;
   dielectrically heating said cut, remaining end portion;
   placing said remaining end portion in a die; and
   remolding said end portion to form said remaining end part.

6. A method of manufacturing an automobile decoration molding, comprising the steps of:
   extrusion-molding a synthetic resin material into a decoration molding body including at least one end portion formed from a mixture of a synthetic resin material and an electrically conductive powder;
   cutting a part of said at least one end portion obliquely away from a decorative surface of said body;
   heating a remaining portion of said at least one end portion by employing the electrically conductive powder therein; and
   remolding said remaining portion of said at least one end portion of said decoration molding body with a die to form an end part.

7. A method of manufacturing an automobile decoration molding as claimed in claim 6, wherein said step of extrusion-molding a synthetic resin material comprises a step of extrusion-molding said synthetic resin material kneaded with an electrically conductive metallic powder to form a base and a step of extrusion-molding a material to form a cover on one surface of said base.

8. A method of manufacturing an automobile decoration molding as claimed in claim 6, wherein said step of extrusion-molding a synthetic resin material comprises a step of extrusion-molding said synthetic resin material kneaded with an electrically conductive metallic powder to form a base and a step of extrusion-molding a material to form a cover on the entire surfaces of said base.

* * * * *